US010066599B2

(12) United States Patent
Ohlerich et al.

(10) Patent No.: US 10,066,599 B2
(45) Date of Patent: Sep. 4, 2018

(54) SPAR CAP ASSEMBLY FOR A WIND TURBINE ROTOR BLADE

(71) Applicant: Nordex Energy GmbH, Hamburg (DE)

(72) Inventors: Nick Ohlerich, Rostock (DE); Hendrik Klein, Rostock (DE); Nils-Hendric Schall, Berlin (DE)

(73) Assignee: Nordex Energy GmbH, Hamburg (DE)

( * ) Notice: Subject to any disclaimer, the term of this patent is extended or adjusted under 35 U.S.C. 154(b) by 409 days.

(21) Appl. No.: 14/680,736

(22) Filed: Apr. 7, 2015

(65) Prior Publication Data
US 2015/0292479 A1 Oct. 15, 2015

(30) Foreign Application Priority Data

Apr. 10, 2014 (EP) .................................... 14164235

(51) Int. Cl.
| | |
|---|---|
| *F03D 1/06* | (2006.01) |
| *B29C 70/88* | (2006.01) |
| *B29D 99/00* | (2010.01) |
| *B29C 43/56* | (2006.01) |
| *B29L 31/08* | (2006.01) |
| *B29K 307/04* | (2006.01) |
| *F03D 80/30* | (2016.01) |

(52) U.S. Cl.
CPC ............ *F03D 1/0675* (2013.01); *B29C 43/56* (2013.01); *B29C 70/882* (2013.01); *B29D 99/0028* (2013.01); *B29C 2043/561* (2013.01); *B29K 2307/04* (2013.01); *B29L 2031/08* (2013.01); *B29L 2031/085* (2013.01); *F03D 80/30* (2016.05); *Y02E 10/721* (2013.01); *Y02P 70/523* (2015.11)

(58) Field of Classification Search
CPC ....... F03D 80/30; F03D 1/0675; B29C 43/56; B29C 470/882; B29C 2043/561; B29D 99/0028; B29K 2307/04; B29L 2031/108; B29L 2031/085
USPC ......................................................... 416/230
See application file for complete search history.

(56) References Cited

U.S. PATENT DOCUMENTS

| | | | |
|---|---|---|---|
| 6,457,943 B1 | 10/2002 | Olsen et al. | |
| 7,494,324 B2 | 2/2009 | Hibbard | |
| 7,651,320 B2 | 1/2010 | Hansen | |
| 8,118,559 B2 | 2/2012 | Llorente Gonzalez et al. | |
| 8,133,031 B2 * | 3/2012 | Arinaga ................. | H02G 13/00 29/889.71 |
| 8,191,255 B2 | 6/2012 | Kristensen et al. | |
| 8,896,980 B2 | 11/2014 | Kristensen et al. | |

(Continued)

FOREIGN PATENT DOCUMENTS

WO 2009/153344 A1 12/2009

*Primary Examiner* — Aaron R Eastman
(74) *Attorney, Agent, or Firm* — Walter Ottesen, P.A.

(57) ABSTRACT

A spar cap assembly is for a wind turbine rotor blade. The spar cap assembly has a spar cap reinforced with carbon fibers, comprising a lightning conductor, which is arranged so as to run along the spar cap, and at least one potential-equalizing element, which establishes an electrical connection between the spar cap and the lightning conductor. The carbon fibers of the spar cap, the lightning conductor and the at least one potential-equalizing element are embedded in a common polymer matrix and are configured as a prefabricated assembly for integration into a wind turbine rotor blade half-shell after the curing of the polymer matrix.

14 Claims, 4 Drawing Sheets

(56) References Cited

U.S. PATENT DOCUMENTS

| | | | |
|---|---|---|---|
| 2004/0028528 A1* | 2/2004 | Flemming | F03D 80/30 416/146 R |
| 2009/0196751 A1* | 8/2009 | Jacobsen | F03D 1/0675 416/146 R |
| 2010/0329865 A1* | 12/2010 | Hibbard | F03D 80/30 416/146 R |
| 2011/0142644 A1* | 6/2011 | Fritz | F03D 1/0675 416/146 R |
| 2013/0049249 A1 | 2/2013 | Frankowski et al. | |
| 2014/0301859 A1 | 10/2014 | Hancock et al. | |

* cited by examiner

SPAR CAP ASSEMBLY FOR A WIND TURBINE ROTOR BLADE

CROSS REFERENCE TO RELATED APPLICATION

This application claims priority of European patent application no. 14 164 235.5, filed Apr. 10, 2014, the entire content of which is incorporated herein by reference.

FIELD OF THE INVENTION

The invention relates to a spar cap assembly for a wind turbine rotor blade that has a spar cap reinforced with carbon fibers.

BACKGROUND OF THE INVENTION

Such a spar cap assembly is disclosed by United States patent application publication 2013/0049249. The prefabricated spar cap assembly is integrated into a rotor blade half-shell after the curing of a polymer matrix in which the carbon fibers are embedded.

Since the carbon fibers forming the spar cap are electrically conductive, special measures for effective lightning protection are required in the case of such a rotor blade. These include, in particular, effective potential equalization between a lightning conductor, which is incorporated in the wind turbine rotor blade and connects a lightning receptor arranged particularly at the tip of the blade to the root of the blade, and the spar cap. The potential equalization can have the effect of preventing an electromagnetically induced discharge of a high lightning-stroke current by way of the lightning conductor from causing such great differences in potential between the lightning conductor and the spar cap that voltage flashovers occur. As a result, damage to the wind turbine rotor blade by a lightning strike can be avoided.

U.S. Pat. No. 7,494,324 discloses a wind turbine rotor blade in which an internal, electrically conductive spar is connected to an adjacently arranged lightning conductor. Provided for this purpose are potential-equalizing elements, which connect the spar and the lightning conductor to one another by way of an electrical line. The contact with the spar is established by way of a conductive ribbon.

U.S. Pat. No. 6,457,943 discloses a wind turbine rotor blade with a number of electrically conductive spar caps of a carbon fiber material. To increase the electrical conductivity of the spar caps, metal-coated carbon fibers are used, so that the current-carrying capacity of the spar caps should be sufficient for use as a lightning conductor. In addition, a centrally arranged metallic lightning conductor may be used. The spar caps and possibly the additional metallic lightning conductor are connected to one another at a number of longitudinal positions by way of potential-equalizing elements in the form of internal electrical conductors.

U.S. Pat. No. 7,651,320 discloses a wind turbine rotor blade with electrically conductive main spar caps of a carbon fiber material and two lightning conductors arranged inside the rotor blade. Potential equalization between a main spar cap and a lightning conductor is established by way of a copper mesh, which electrically contacts the main spar cap, and an electrical connecting line. A middle portion of the connecting line is screwed to the lightning conductor. A free end of the connecting line is screwed along with metallic adapters and the copper mesh to a lightning receptor.

U.S. Pat. Nos. 8,896,980 and 8,191,255 disclose a wind turbine rotor blade in which a flat or braided lightning conductor is arranged in the region of a web. The lightning conductor is integrated into a laminate in a vacuum-infusion process during the production of the wind turbine rotor blade.

SUMMARY OF THE INVENTION

It is an object of the invention to provide a spar cap assembly for a wind turbine rotor blade with a carbon-fiber-reinforced spar cap which makes a simpler manufacture of a wind turbine rotor blade with a lightning protection device possible.

This object is achieved by a spar cap assembly for a wind turbine rotor blade, the spar cap assembly having the following:
- a spar cap reinforced with carbon fibers,
- a lightning conductor, which is arranged so as to run along the spar cap, and
- at least one potential-equalizing element, which establishes an electrical connection between the spar cap and the lightning conductor,
- the carbon fibers of the spar cap, the lightning conductor and the at least one potential-equalizing element being embedded in a common polymer matrix and being configured as a prefabricated assembly for integration into a wind turbine rotor blade half-shell after the curing of the polymer matrix.

The spar cap forms an element of the supporting structure of the wind turbine rotor blade. In particular, it may be a main spar cap, which absorbs a large part of the tensile loads occurring during the operation of the wind turbine rotor blade. The carbon fibers forming the spar cap may be placed into a spar-cap-assembly production mold in the form of scrims, in a multiplicity of layers lying one on top of the other. The spar cap may be of a rectangular or trapezoidal form in cross section. It may have a length of for example 40 m or more.

The lightning conductor runs along the spar cap and, in particular, extends over the entire length of the spar cap, possibly even beyond it. It has a current-carrying capacity that is sufficient for discharging a lightning-strike current. For this purpose, it may for example be made of copper and have an effective cross section of 25 $mm^2$ or more, in particular of approximately 50 $mm^2$. It extends parallel to the spar cap and may be arranged directly on the spar cap or parallel thereto at a distance, in particular closely alongside the spar cap. The lightning conductor may be a solid metallic conductor or comprise a multiplicity of individual wires, in particular in the form of a braided tube, for example of copper.

The potential-equalizing element is electrically conductive and is in electrical contact on the one hand with the spar cap and on the other hand with the lightning conductor. It may likewise comprise a multiplicity of individual wires, in particular of copper. For example, it may be a woven or knitted fabric or mesh of a multiplicity of individual wires, in particular a filter braid, which is usually used as a filter medium.

In the case of the invention, the carbon fibers of the spar cap, the lightning conductor and the at least one potential-equalizing element are embedded in a common polymer matrix. This may take place, in particular, in a vacuum-infusion process in a production mold for the spar cap assembly. In a vacuum-infusion process, the elements to be embedded are arranged in a production mold, which is closed in an airtight manner and subsequently evacuated. The negative pressure within the production mold causes a liquid polymer material to flow into the mold. After the curing of the liquid polymer material, the elements are embedded in a polymer matrix.

The prefabricated spar cap assembly obtained after the curing of the polymer matrix can be removed from its production mold and subsequently integrated into a wind turbine rotor blade half-shell. For this purpose, it may for example be adhesively bonded to a prefabricated wind turbine rotor blade half-shell and/or be embedded along with reinforcing fibers and possibly further elements of the wind turbine rotor blade half-shell in a polymer matrix in a further vacuum-infusion process.

The invention is based on the finding that it is laborious for a rotor blade to be subsequently provided with a prefabricated main spar cap with a lightning protection device, which particularly provides potential equalization with respect to the main spar cap. The inclusion of the lightning conductor and the at least one potential-equalizing element in the production process for the spar cap assembly, as provided by the invention, has the effect of simplifying the further production of the wind turbine rotor blade. In particular, the large-format production molds that are used for the production of the wind turbine rotor blade half-shell can be used more efficiently, because central elements of the lightning protection device are already prefabricated along with the spar cap. A further advantage is in the electrical contacting of the lightning conductor, and in particular the spar cap, by the at least one potential-equalizing element, which in the case of the invention is particularly simple and reliable.

In an embodiment, the potential-equalizing element is arranged obliquely in relation to a longitudinal direction of the spar cap. The angle between a longitudinal direction of the potential-equalizing element and the longitudinal direction of the spar cap may for example lie in the range from 10° to 80°, preferably in the range from approximately 30° to approximately 60°. This refinement takes into account the additional strength given to the spar cap by the potential-equalizing element and ensures that there is no abrupt change in strength in the longitudinal direction of the spar cap assembly as a result of the potential-equalizing element.

In an embodiment, a portion of the potential-equalizing element lies against a first layer of the carbon fibers of the spar cap and is covered over by a second layer of carbon fibers of the spar cap or a layer of further carbon fibers, which reaches up to the lightning conductor. The portion of the potential-equalizing element is consequently arranged between two layers of carbon fibers. As a result, the transfer resistance between the potential-equalizing element and the spar cap can be reduced. The application of an electrically conductive top layer of carbon fibers also improves the electrical contact between the spar cap and the lightning conductor.

In an embodiment, the lightning conductor has a solid connecting body of metal for the connection to an element of a lightning protection device that does not belong to the spar cap assembly. In the finished wind turbine rotor blade, the lightning conductor must generally be connected to further elements of a lightning protection device that are not integrated into the spar cap assembly. This may be for example one or more lightning receptors or a further potential-equalizing element, which brings about an equalization of the potential between the lightning conductor and some other electrically conductive element of the wind turbine rotor blade. For example, a further carbon-containing spar cap of the wind turbine rotor blade, a further lightning conductor, a shielding of a signaling line or an electrical supply line may be connected in this way to the lightning conductor. The connecting body may, in particular, be made of copper. The solid form provides sufficiently large contact areas and makes it possible to establish a connection that has a sufficient current-carrying capacity.

In an embodiment, the solid connecting body has an internal thread. The internal thread may be arranged in a through-bore in the connecting body. It makes it possible to produce a screwed connection to establish the electrical connection.

In an embodiment, the solid connecting body connects the lightning conductor and the potential-equalizing element electrically to one another. In particular, the connecting body may have been produced in an exothermic welding process, so that portions of the potential-equalizing element and of the lightning conductor, in particular in each case a multiplicity of individual wires forming these elements, may have been fused to one another in the connecting body. The connecting body may perform a dual function. On the one hand it establishes a permanent and reliable electrical connection between the lightning conductor and the potential-equalizing element, on the other hand it offers a connection possibility for establishing a further electrical connection, as already described.

In an embodiment, the solid connecting body is arranged on an inner side of the spar cap assembly, which after integration of the spar cap assembly into a wind turbine rotor blade half-shell is facing an interior space of the wind turbine rotor blade half-shell. In the case of this arrangement, the connecting body is accessible from the interior space of the wind turbine rotor blade half-shell, so that internal potential-equalizing elements can be connected particularly easily.

In an embodiment, the spar cap assembly has an inlay of a core material arranged to the side of the carbon fibers of the spar cap, and the lightning conductor is arranged in a groove of the inlay. The core material may be for example balsa wood or an expanded plastics material, as is customary for the production of a middle layer of components of fiber-reinforced plastics materials produced in a sandwich type of construction. The material of the inlay may, in particular, correspond to the core material at the respective longitudinal position of the rotor blade. There may be a number of inlays integrated into the spar cap assembly, in particular arranged to both sides of the carbon fibers of the spar cap. The inlays may be formed in a way that complements lateral surfaces of the spar cap, so that they directly adjoin the carbon fibers and supplement the cross section of the spar cap in such a way that the spar cap assembly as a whole has a form that is advantageous for the integration into a wind turbine rotor blade half-shell. Altogether, the spar cap assembly supplemented by one or more inlays may be of an approximately rectangular or approximately trapezoidal form in cross section. What is meant by approximately rectangular or approximately trapezoidal is that, in particular, the longitudinal sides of the cross-sectional form may possibly be slightly curved, in particular in a way corresponding to the geometry of an aerodynamic envelope of the wind turbine rotor blade for which the spar cap assembly is intended. The forming of a groove in the inlay (it may for example be a cross-sectionally wedge-shaped inlay directly adjoining the carbon fibers or a cross-sectionally substantially rectangular inlay arranged alongside) simplifies the arrangement of the lightning conductor, which is predetermined by the groove. At the same time, this is conducive to complete embedding of the lightning conductor in the polymer matrix while maintaining a desired cross-sectional geometry of the spar cap assembly. If the cross section of the spar cap assembly as a whole is approximately rectangular, the two longitudinal sides of the rectangle may—always with respect to the intended arrangement of the spar cap assembly in a wind turbine rotor blade half-shell—be facing an inner side and an outer side, respectively, of the wind turbine rotor blade, or form these sides, and the two narrow sides of the rectangle may be facing a profile leading edge and a profile trailing edge of the wind turbine rotor blade half-shell. The lightning conductor may, in particular, be arranged in a groove of an inlay that is arranged on the side of the spar cap assembly that is facing the profile trailing edge.

In an embodiment, the inlay has a through-opening, which leads from the groove to an opposite side of the inlay and in which a metal body electrically connected to the lightning conductor may be arranged. In particular, the groove may be arranged on an inner side of the spar cap assembly and the through-opening may lead from there to an outer side of the inlay. The metal body may, in particular, lie against a connecting body and/or be fastened to it. In this way, the metal body provides a connection point for the lightning conductor on the outer side or near the outer side of the spar cap assembly. To this connection point there may be connected for example a potential-equalizing element arranged on the outer side of the wind turbine rotor blade half-shell or a lightning conductor arranged there.

In an embodiment, the inlay has in the region of the through-opening an insert of a stronger material, in which the through-opening is arranged. The stronger material has a greater strength than the core material of which the other regions of the inlay are made. The stronger material may be for example glass-fiber-reinforced plastic. The use of a stronger material in an area around the through-opening makes possible mechanically more stable fixing of the metal body in the through-opening and/or more stable lining of the connecting body for a fastening to the wind turbine rotor blade that engages on the blade from an outer side. The insert of the stronger material may also extend over the region of the potential-equalizing element. As a result, unification of the inserts over the length of the rotor blade is possible, irrespective of whether or not there are through-openings.

In an embodiment, the metal body is a metal bush that is screwed into an internal thread of the connecting body and has a continuous threaded bore, which runs from an inner side of the spar cap assembly to the opposite outer side of the spar cap assembly. In the case of this refinement, the metal body is fastened to the connecting body securely and with sufficient current-carrying capacity, and offers a simple connection possibility on the inner side and the outer side of the spar cap assembly in the form of the threaded bore arranged there. The metal bush may for example be made of copper, aluminum, steel, brass or some other alloy.

In an embodiment, the spar cap assembly has a layer of a fiber material, which is arranged on an outer side of the spar cap assembly opposite from the inner side and adjoins the carbon fibers of the spar cap. The layer of the fiber material may comprise a number of layers of a fiber material, for example one or more layers of a glass-fiber fabric or scrim. During the production of the spar cap assembly in a vacuum-infusion process, this layer may be conducive to a uniform distribution of the liquid polymer material. The layer of the fiber material may also adjoin one or more inlays or be arranged under them, so that the layer of the fiber material connects the inlay or inlays and the carbon fiber material of the spar cap to form a stable unit. It is a further object of the invention to provide a corresponding manufacturing process.

The aforementioned object is achieved by a method for the manufacture of a wind turbine rotor blade half-shell, the method having the following steps:
  providing a production mold for the wind turbine rotor blade half-shell,
  placing reinforcing fibers into the production mold,
  arranging a spar cap assembly in the production mold, the spar cap assembly having a spar cap reinforced with carbon fibers, a lightning conductor arranged so as to run along the spar cap, at least one potential-equalizing element configured to establish an electrical connection between the spar cap and the lightning conductor, and, the carbon fibers of the spar cap, the lightning conductor and the at least one potential-equalizing element being embedded in a common polymer matrix and being configured as a prefabricated assembly for integration into a wind turbine rotor blade half-shell after a curing of the polymer matrix;
  embedding the reinforcing fibers and the spar cap assembly in a polymer matrix.

In the process, the spar cap assembly described above is integrated into a wind turbine rotor blade half-shell. This may, in particular, take place in a vacuum-infusion process, in which the reinforcing fibers are first embedded in a polymer matrix and at the same time connected to the already cured, prefabricated spar cap assembly. It goes without saying that the spar cap assembly does not necessarily have to be embedded on all sides in the polymer matrix of the wind turbine rotor blade half-shell. The embedding of the spar cap assembly may also substantially comprise an adhesive bonding of the spar cap assembly to the reinforcing fibers of the wind turbine rotor blade half-shell. For the features of the process and its advantages, reference is made to the explanations above relating to the spar cap assembly that is used in the process, which apply correspondingly.

In an embodiment of the process, an electrical connection between the lightning conductor and an element of a lightning protection device that does not belong to the spar cap assembly is established after the embedding of the reinforcing fibers and the spar cap assembly in the polymer matrix. The element of the lightning protection device that does not belong to the spar cap assembly may be for example a further spar cap, a further lightning conductor, a lightning receptor or a further potential-equalizing element, as already described in connection with the spar cap assembly. The connection may, in particular, be established by using a connecting body or metal body integrated into the spar cap assembly, as explained above. In this way, the lightning protection device of the wind turbine rotor blade can be completed particularly easily by using the prefabricated assembly.

In an embodiment, an opening in the spar cap assembly that is used for establishing the electrical connection is closed by a covering before the embedding of the reinforcing fibers and the spar cap assembly in the polymer matrix. The covering may, in particular, be an adhesive pad that is stuck onto the opening in the spar cap assembly. The opening may, in particular, be a threaded bore in a connecting body or a metal body of the spar cap assembly, as explained above. After the embedding of the reinforcing fibers and the spar cap assembly in the polymer matrix, the opening can be easily made freely accessible again by drilling through the laminate lying over it and the adhesive pad.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
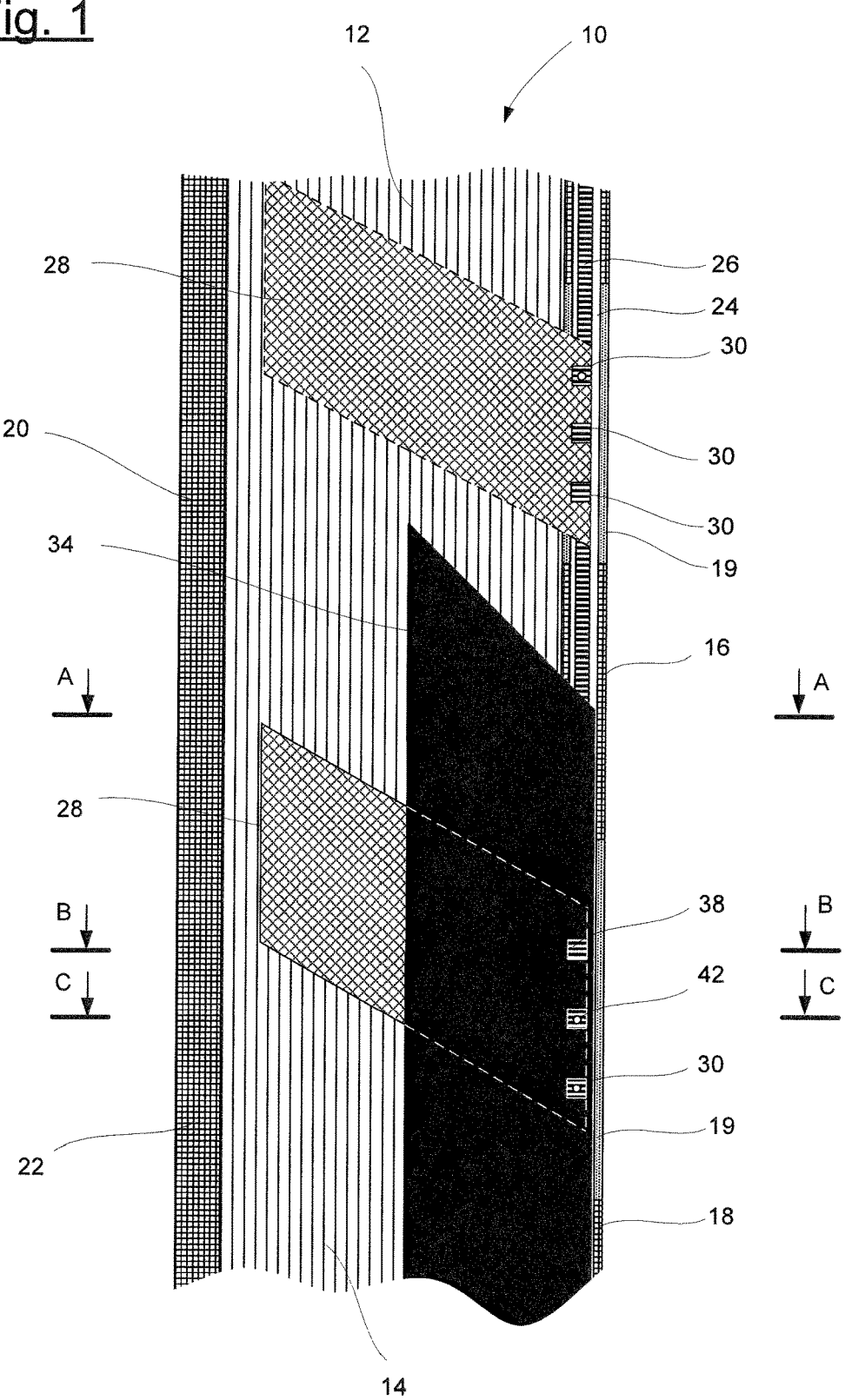
FIG. 1 shows a detail of a spar cap assembly according to the invention in a plan view of the inner side.

In FIG. 1, a portion about 2 m long of a spar cap assembly 10 for a wind turbine rotor blade is shown in a plan view. The portion shown continues in the downward direction to an end on the blade root side, in the upward direction to an end on the blade tip side. Altogether, the spar cap assembly 10 has a length of, for example, 40 m or more.

A multiplicity of carbon fibers extend along a longitudinal direction of the spar cap assembly 10 from the end on the blade root side to the end on the blade tip side. They form a spar cap 12. The spar cap assembly 10 has an inner side 14, which is facing the viewer and, after integration of the spar cap assembly 10 into a wind turbine rotor blade half-shell, faces into an interior space of the half-shell. The side face 16 that is arranged on the right in FIG. 1 is facing a profile trailing edge and is formed by an inlay 18 of a core material. The side face 20 of the spar cap assembly 10 that is arranged on the left in FIG. 1 is facing a profile leading edge and is formed by a further inlay 22.

The inlay 18 has on the inner side 14 of the spar cap assembly 10 a groove 24, in which a lightning conductor 26, which is made of a copper braided tube, is arranged. In the region of the potential-equalizing elements 28, the inlay 18 has inserts 19 of a glass-fiber-reinforced plastics material, in order to achieve a greater strength.

The two rhomboidal potential-equalizing elements 28 are blanks cut out from a copper filter braid. They lie with a large part of their surface area against the inner side of the spar cap 12 and are connected to the lightning conductor 26 by each of three connecting bodies 30. In this way, an electrical connection is established between the spar cap 12 and the lightning conductor 26.

The lower of the two potential-equalizing elements 28 shown is partially covered by a top layer 34 of a carbon fiber material. Such a top layer 34 is likewise present in the case of the upper potential-equalizing element 28, but is not shown for illustrative reasons. Applying the electrically conductive top layer 34 has the effect of improving the electrical contact between the spar cap 12 and the lightning conductor 26. The top layer 34 extends over part of the width and over the length of the spar cap 12. At its ends, it is beveled at an angle of about 45°. Alternatively, the top layer 34 may also only be arranged in the region of the potential-equalizing element 28. It is then likewise of a rhomboidal form and in the region of the lightning conductor 26 projects beyond the potential-equalizing element 28. In this variant, the potential-equalizing elements 28 and also the top layers 34 are arranged obliquely in relation to a longitudinal direction of the spar cap 12, at an angle of about 45°.

Figure 2:
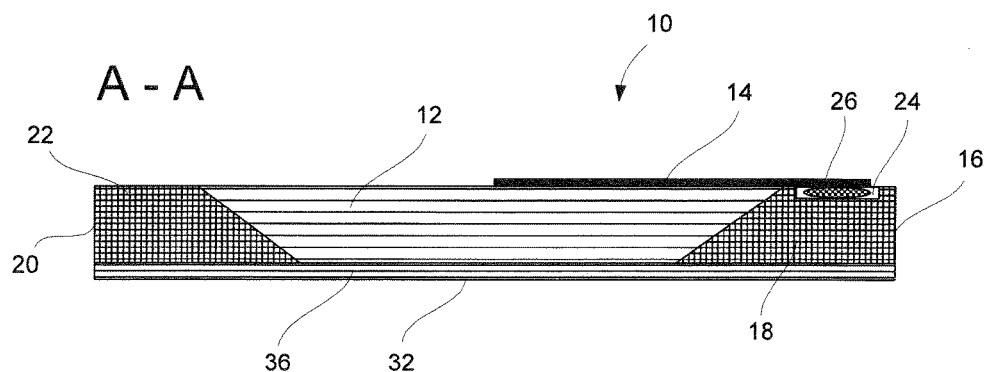
FIG. 2 shows a cross section through the spar cap assembly of FIG. 1 along the plane denoted by A-A.

The cross-sectional representation of FIG. 2 illustrates the construction of the spar cap assembly 10 in a region in which no potential-equalizing element 28 is arranged. In the cross section there can be seen at the bottom a layer 36, which is made of a number of layers of a glass-fiber material and extends over the entire width of the spar cap assembly 10, that is, from the side face 16 to the side face 20. It can be seen that the spar cap 12 is trapezoidal in cross section and is made of a multiplicity of layers of a carbon fiber material. The two inlays 18, 22 are arranged on both sides of the spar cap 12 and are of a wedge-shaped form, so that they adjoin the oblique sides of the cross-sectionally trapezoidal spar cap 12 in a complementary manner. As a whole, the spar cap assembly 10 is substantially rectangular in cross section.

The cross-sectionally rectangular groove 24 in the inlay 18, in which the lightning conductor 26 is arranged, can be seen well. The groove 24 is of such dimensions that it is substantially filled by the lightning conductor 26, without the lightning conductor 26 protruding from the groove. As a result, the inner side 14 of the spar cap assembly 10 is provided with a straight contour.

The layer 36 forms an outer side 32 of the spar cap assembly 10 and lies against the spar cap 12 and against the two inlays 18, 22.

Figure 3:
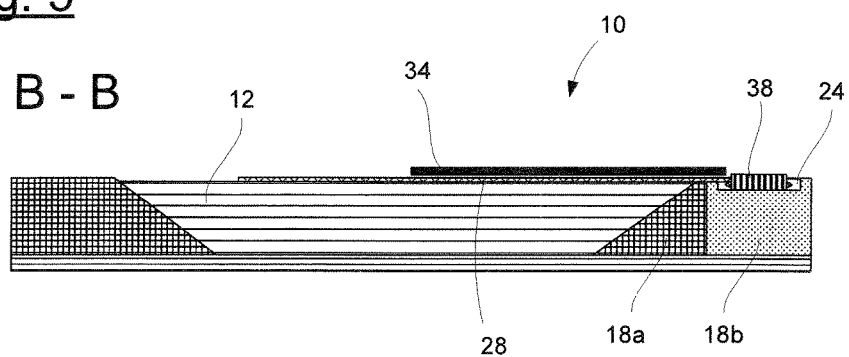
FIG. 3 shows a cross section through the spar cap assembly of FIG. 1 along the plane denoted by B-B.

FIG. 3 shows the cross section of the spar cap assembly 10 along the plane that is denoted by B-B, in which a connecting body 38 is arranged. The connecting body 38 is a substantially cuboidal block of solid copper, which establishes an electrical connection between the potential-equalizing element 28 and the lightning conductor 26. For this purpose, it has been produced in an exothermic welding process, so that individual wires of the potential-equalizing element 28 and individual wires of the lightning conductor 26 are fused together in it. In the region of the connecting body 38, the inlay 18 is divided in two in cross section, into a wedge-shaped portion 18a and a rectangular portion 18b, in which the groove 24 is formed. The wedge-shaped portion 18a is made of a foam-like material, while the rectangular portion 18b is made of a cured glass-fiber-reinforced plastic. The covering of the potential-equalizing element 28 by the top layer 34 can be seen well in FIG. 3. In the region of the connecting bodies 38, the top layer has cutouts.

Figure 4:
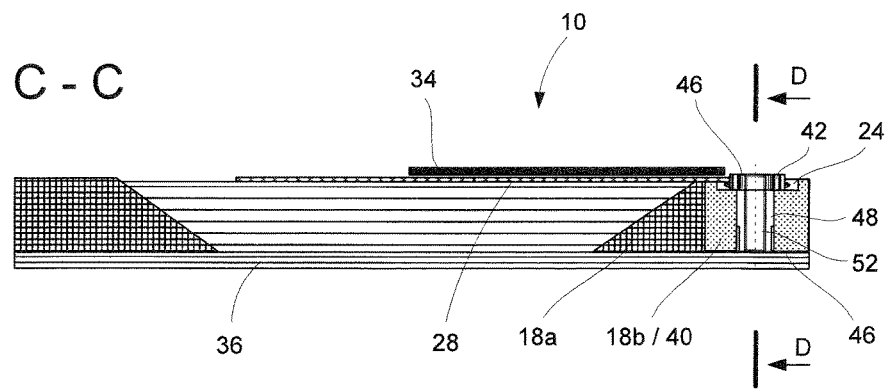
FIG. 4 shows a cross section through the spar cap assembly of FIG. 1 along the plane denoted by C-C.

FIG. 4 shows a cross section through the spar cap assembly 10 in the region of the plane denoted by C-C, in which a connecting body 42 and a metal bush 48 are arranged. The connecting body 42 corresponds to the already explained connecting body 38, but additionally has an internal thread 46. The internal thread 46 can be used to easily establish an electrical connection with the lightning conductor 26 from the inner side of the wind turbine rotor blade half-shell.

In the example shown, the portion 18b of the inlay 18 is formed by an insert 40 of a glass-fiber-reinforced plastic, in which there is formed under the connecting body 42 a through-opening 44, which leads from the groove 24 to an underside 46 of the insert 40 that is facing the outer side 32. Inserted in the through-opening 44 is a metal bush 48, which is screwed by a threaded portion into the internal thread 50 of the connecting body 42. The metal bush 48 has for its part a threaded bore 52, which reaches up to the underside 46 of the insert 40, and consequently to the layer 36. After integration of the spar cap assembly 10 into a wind turbine rotor blade half-shell, this threaded bore 52 is accessible from the outer side thereof when drilling through the layer 36 is performed for this purpose.

Figure 5:
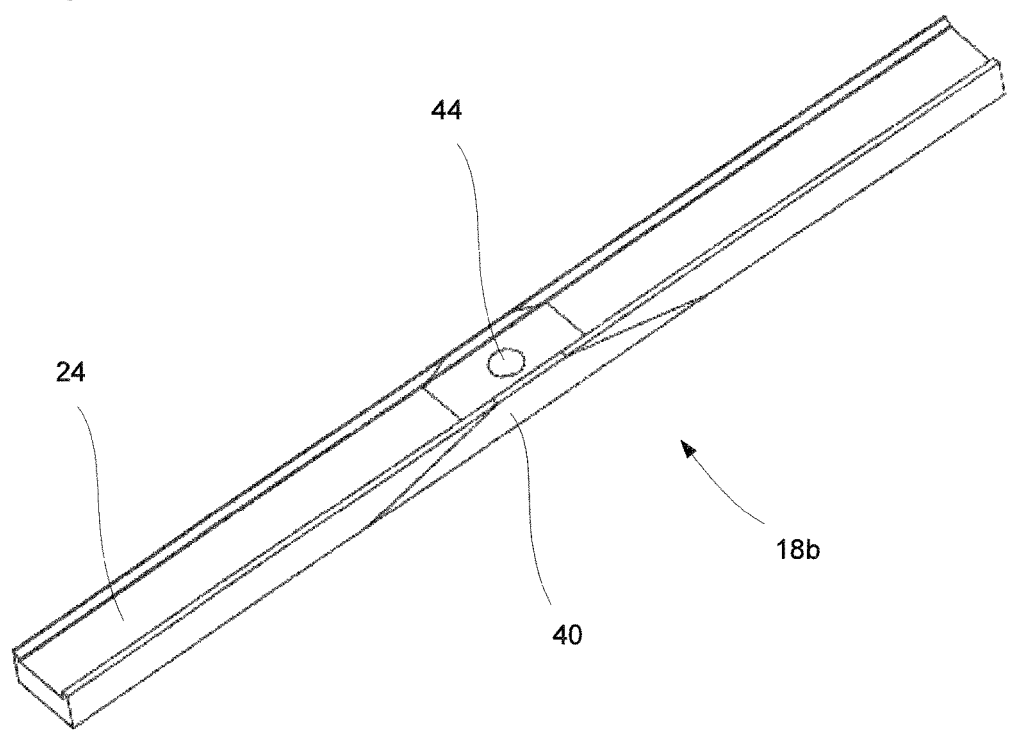
FIG. 5 shows a perspective representation of a portion of an inlay of the spar cap assembly of FIG. 1.

In the perspective representation of FIG. 5, the arrangement of the insert 40 in the inlay 18b is illustrated once again. The insert 40, which is made of a glass-fiber-reinforced plastic and is trapezoidal in longitudinal section, and the further portions of the inlay adjoining the insert and being made of a core material, such as for example balsa wood or a plastic foam, can be seen. The groove 24, into which the lightning conductor 26 (not represented) is placed, extends over the entire length of the inlay 18b. In the insert 40, the through-opening 44 can be seen.

Figure 6:
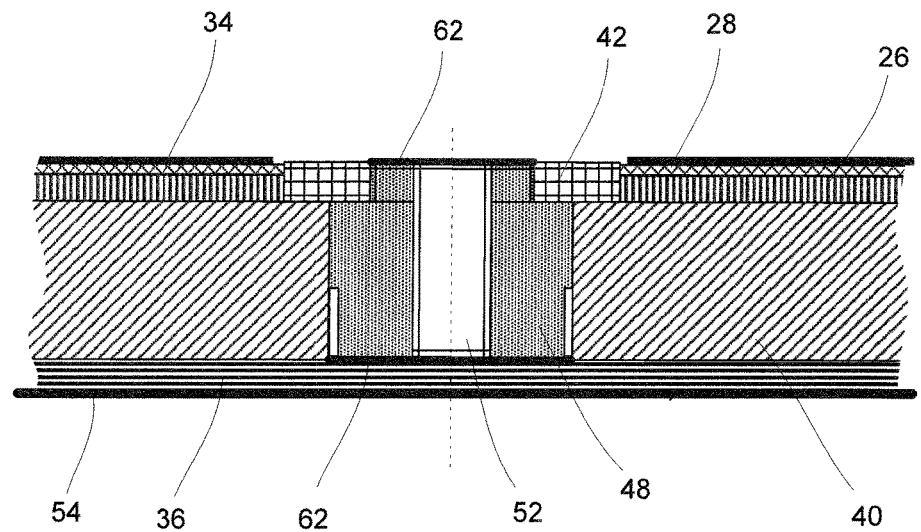
FIG. 6 shows a cross section through the spar cap assembly of FIG. 1 along the plane denoted in FIG. 4 by D-D; and, FIG. 7 shows the detail of the spar cap assembly of FIG. 1 that is represented in FIG. 6 after integration into a wind turbine rotor blade half-shell.

The cross-sectional representation of FIG. 6 illustrates once again the arrangement of the metal bush 48 in the insert 40. The threaded portion of the metal bush 48 screwed into the connecting body 42 and the threaded bore 52 formed therein can be seen particularly well. The connecting body 42 connects the lightning conductor 26 and the potential-equalizing element 28 arranged directly above the latter to one another. The metal bush 48 is screwed into the connecting body 42 and is pushed into the through-opening 44 in the insert 40 when the lightning conductor 26 is placed into the groove of the inlay. The potential-equalizing element 28 is placed flat onto the layers of the spar cap and covered by a top layer 34 of carbon-fiber-reinforced plastic. The layer 36 of glass-fiber-reinforced plastic extends under the entire arrangement and adjoins with its underside the indicated production mold 54 for the spar cap assembly 10. The threaded bore 52 in the metal bush 48 is closed on both sides by an adhesive pad 62, so that neither during the vacuum infusion for the production of the spar cap assembly 10 nor during the subsequent integration of the spar cap assembly 10 into a wind turbine rotor blade half-shell in a further vacuum-infusion process can liquid polymer material get into the threaded bore 52.

Figure 7:
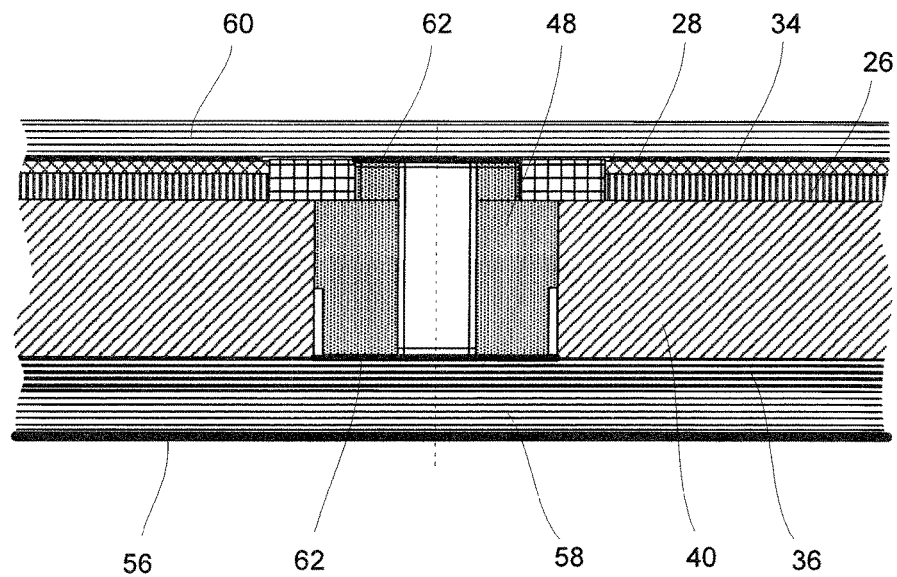

FIG. 7 shows in cross section how the spar cap assembly 10 is integrated into a wind turbine rotor blade half-shell. For this purpose, the spar cap assembly 10 is removed from the production mold 54 for the spar cap assembly and placed into the production mold 56 for the wind turbine rotor blade half-shell, after a number of layers of reinforcing fibers 58 have first been placed into the production mold 56. Further layers of reinforcing fibers 58 are arranged above the spar cap assembly 10. The entire arrangement is then embedded in a polymer matrix in a vacuum-infusion process. The metal bush 48, the threaded bore 52 arranged therein and/or the adhesive pads 62 remain visible from the outside, or at least locatable, through the layers of reinforcing fibers 58, 60, so that they can be made accessible by specifically intended drillings from the inner side or outer side of the wind turbine rotor blade half-shell.

It is understood that the foregoing description is that of the preferred embodiments of the invention and that various changes and modifications may be made thereto without departing from the spirit and scope of the invention as defined in the appended claims.

LIST OF THE DESIGNATIONS USED

10 Spar cap assembly
12 Spar cap
14 Inner side
16 Side face
18 Inlay
19 Glass-fiber-reinforced insert
20 Side face
22 Further inlay
24 Groove
26 Lightning conductor
28 Potential-equalizing element
30 Connecting body
32 Outer side
34 Top layer
36 Layer
38 Connecting body
40 Insert
42 Connecting body
44 Through-opening
46 Underside
48 Metal bush
50 Internal thread
52 Threaded bore
54 Production mold for spar cap assembly
56 Production mold for wind turbine rotor blade half-shell
58 Reinforcing fibers
60 Reinforcing fibers
62 Adhesive pad

What is claimed is:

1. A spar cap assembly for a wind turbine rotor blade, the spar cap assembly comprising:
   a spar cap reinforced with carbon fibers;
   a lightning conductor arranged so as to run along said spar cap;
   at least one potential-equalizing element configured to establish an electrical connection between said spar cap and said lightning conductor; and,
   said carbon fibers of said spar cap, said lightning conductor and said at least one potential-equalizing element being embedded in a common polymer matrix and being configured as a prefabricated assembly for integration into a wind turbine rotor blade half-shell after a curing of the polymer matrix.

2. The spar cap assembly of claim 1, wherein:
   said spar cap defines a longitudinal direction; and,
   said at least one potential-equalizing element is arranged obliquely with respect to said longitudinal direction.

3. The spar cap assembly of claim 1, wherein:
   said carbon fibers define a first and a second layer thereof;
   said at least one potential-equalizing element has a portion lying against said first layer; and,
   said second layer covers said portion.

4. The spar cap assembly of claim 1 further comprising:
   a layer of further carbon fibers;
   said carbon fibers defining a first layer thereof;
   said at least one potential-equalizing element having a portion lying against said first layer; and,
   said layer of further carbon fibers covering said portion.

5. The spar cap assembly of claim 1, wherein said lightning conductor has a solid connecting body of metal configured to connect to an element of a lightning protection device.

6. The spar cap assembly of claim 5, wherein said solid connecting body has an internal thread.

7. The spar cap assembly of claim 5, wherein said solid connecting body interconnects said lightning conductor and said at least one potential-equalizing element.

8. The spar cap assembly of claim 5, wherein:
   the spar cap assembly is configured to be integrated into said rotor blade half-shell;
   said rotor blade half-shell defining an interior space;

the spar cap assembly has an inner side configured to face the interior space of the wind turbine rotor blade half-shell after integration; and, said solid connecting body is arranged on said inner side.

9. The spar cap assembly of claim 1 further comprising:

an inlay of a core material arranged laterally of said carbon fibers and defining a groove; and, said lightning conductor being arranged in said groove.

10. The spar cap assembly of claim 9 further comprising:

a metal body electrically connected to said lightning conductor;

said inlay defining a through-opening leading from said groove to the opposite lying side of said inlay; and, said metal body being arranged in said through-opening.

11. The spar cap assembly of claim 10, wherein:

the spar cap assembly has an inner side and an outer side disposed opposite said inner side;

said inlay has an insert in the region of said through-opening;

said insert is of a first material having a greater mechanical strength than said core material; and, said through-opening is arranged in said insert.

12. The spar cap assembly of claim 1 further comprising:

a layer of fiber material;

the spar cap assembly having an inner side and an outer side disposed opposite said inner side; and, said layer of fiber material being arranged on said outer side of said spar cap assembly and adjoining said carbon fibers of said spar cap.

13. A spar cap assembly for a wind turbine rotor blade having a lightning protection device, the spar cap assembly comprising:

a spar cap reinforced with carbon fibers;

a lightning conductor arranged so as to run along said spar cap;

at least one potential-equalizing element configured to establish an electrical connection between said spar cap and said lightning conductor;

said carbon fibers of said spar cap, said lightning conductor and said at least one potential-equalizing element being embedded in a common polymer matrix and being configured as a prefabricated assembly for integration into a wind turbine rotor blade half-shell after a curing of the polymer matrix;

an inlay of a core material arranged laterally of said carbon fibers and defining a groove;

said lightning conductor being arranged in said groove;

a metal body electrically connected to said lightning conductor;

said inlay defining a through-opening leading from said groove to the opposite lying side of said inlay;

said metal body being arranged in said through-opening;

the spar cap assembly having an inner side and an outer side disposed opposite said inner side;

said lightning conductor having a solid connecting body of metal configured to connect to an element of the lightning protection device;

said solid connecting body having an internal thread; and, said metal body being a metal bush threadably engaged in said internal thread of said connecting body and having a continuous threaded bore running from said inner side of the spar cap assembly to said outer side of the spar cap assembly.

14. A spar cap assembly for a wind turbine rotor blade, the spar cap assembly comprising:

a spar cap reinforced with carbon fibers;

a lightning conductor arranged so as to run along said spar cap;

at least one potential-equalizing element configured to establish an electrical connection between said spar cap and said lightning conductor;

said carbon fibers of said spar cap, said lightning conductor and said at least one potential-equalizing element being embedded in a common polymer matrix and being configured as a prefabricated assembly for integration into a wind turbine rotor blade half-shell after a curing of the polymer matrix;

an inlay of a core material arranged laterally of said carbon fibers and defining a groove;

said lightning conductor being arranged in said groove; and, said inlay of core material adjoining said spar cap in a complementary manner.

* * * * *